(12) United States Patent
Li et al.

(10) Patent No.: US 11,698,055 B2
(45) Date of Patent: *Jul. 11, 2023

(54) SELF-INSPECTION METHOD AND DEVICE FOR HYDRAULIC CONTROL TURNING SYSTEM OF GENERATOR ROTOR

(71) Applicant: JIANGSU GOLDWIND SCIENCE & TECHNOLOGY CO., LTD., Jiangsu (CN)

(72) Inventors: Hongfeng Li, Jiangsu (CN); Guoshuai Wang, Beijing (CN); Junjie Zheng, Beijing (CN); Endi Zhai, Jiangsu (CN); Xingang Zhang, Jiangsu (CN); Ye Li, Jiangsu (CN)

(73) Assignee: JIANGSU GOLDWIND SCIENCE & TECHNOLOGY CO., LTD., Jiangsu (CN)

( * ) Notice: Subject to any disclaimer, the term of this patent is extended or adjusted under 35 U.S.C. 154(b) by 707 days.

This patent is subject to a terminal disclaimer.

(21) Appl. No.: 16/480,345

(22) PCT Filed: Apr. 26, 2018

(86) PCT No.: PCT/CN2018/084570
§ 371 (c)(1),
(2) Date: Jul. 24, 2019

(87) PCT Pub. No.: WO2019/128008
PCT Pub. Date: Jul. 4, 2019

(65) Prior Publication Data
US 2019/0376493 A1 Dec. 12, 2019

(30) Foreign Application Priority Data

Dec. 28, 2017 (CN) .......................... 201711459630.5

(51) Int. Cl.
*F03D 17/00* (2016.01)
*F03D 80/00* (2016.01)
(Continued)

(52) U.S. Cl.
CPC ............. *F03D 17/00* (2016.05); *F03D 7/042* (2013.01); *F03D 80/00* (2016.05); *G01B 21/00* (2013.01);
(Continued)

(58) Field of Classification Search
None
See application file for complete search history.

(56) References Cited

U.S. PATENT DOCUMENTS 4,050,560 A 9/1977 Torstenfelt
9,366,230 B2 * 6/2016 Perley .................... F03D 7/04
(Continued)

FOREIGN PATENT DOCUMENTS

CN 101054946 A 10/2007
CN 201925109 U 8/2011
(Continued)

OTHER PUBLICATIONS

Extended European Search Report dated Dec. 9, 2019; Appln. No. 18894275.6.
(Continued)

*Primary Examiner* — Juan G Flores (57) ABSTRACT

A self-inspection method for a hydraulic control turning system of a generator rotor includes: establishing a length dimension relationship table among a plurality of hydraulic cylinders of the hydraulic control turning system; selecting a reference hydraulic cylinder, and acquiring a reference length dimension when the reference hydraulic cylinder is located at a target working position, the target working position is a position at which a turning pin corresponding
(Continued)

to the reference hydraulic cylinder is inserted into an adapted hole; and performing a function inspection of a motion execution module in sequence by the plurality of the hydraulic cylinders, based on the reference length dimension and the length dimension relationship table.

10 Claims, 6 Drawing Sheets

(51) Int. Cl.
    *G01B 21/00*     (2006.01)
    *F03D 7/04*     (2006.01)
    *G01B 21/02*     (2006.01)

(52) U.S. Cl.
    CPC ..... *F05B 2260/507* (2013.01); *F05B 2260/80* (2013.01); *F05B 2260/83* (2013.01); *F05B 2270/40* (2013.01); *F05B 2270/506* (2013.01); *F05B 2270/708* (2013.01); *F05B 2270/80* (2013.01); *G01B 21/02* (2013.01)

(56) References Cited

U.S. PATENT DOCUMENTS

| | | | | |
|---|---|---|---|---|
| 11,162,473 | B2* | 11/2021 | Cheng | ............... F03D 1/0691 |
| 2014/0377062 | A1 | 12/2014 | Jakobsen | |
| 2016/0298604 | A1* | 10/2016 | Guern | ............... F03D 80/70 |

FOREIGN PATENT DOCUMENTS

| | | |
|---|---|---|
| CN | 202370759 U | 8/2012 |
| CN | 103644082 A | 3/2014 |
| CN | 103742372 A | 4/2014 |
| CN | 234344384 U | 5/2015 |
| CN | 106677993 A | 5/2017 |

OTHER PUBLICATIONS

The First Chinese Office Action dated Oct. 31, 2019; Appln. No. 201711459630.5.
Fenquan Gao et al; "Structure and Fault Diagnosis of Turning Gear for 200MW Steam Turbine", Turbine Technology, vol. 46, No. 6, Dec. 30, 2004; pp. 470-471; ISSN: 1001-5884.
Yan Ren et al; "Commissioning Research on Hydraulic Turning System of Gas Turbine Generator Set" (Non-Official Translation), Sichuan Electric Power Technology, vol. 39, No. 1, Feb. 20, 2016; pp. 82-86, ISSN: 1003-6954.
Zhengang Zhang; "200MW (Non-officiai translation: Reason analysis and countermeasures for the application failure of the hydraulic turning device of 200MW unit)". (Non-official translation: Proceedings of the 25th Annual Meeting of the National Thermal Power 200MW Class Technical Cooperation Conference), Sep. 1, 2007, pp. 225-227.
International Application Status Report; Received at International Bureau dated May 7, 2018; Publ. No. WO2019/128008.
International Search Report dated Sep. 7, 2018; PCT/CN2018/084570.

* cited by examiner

Figure 7

SELF-INSPECTION METHOD AND DEVICE FOR HYDRAULIC CONTROL TURNING SYSTEM OF GENERATOR ROTOR

The present application is the national phase of International Application No. PCT/CN2018/084570, titled "SELF-INSPECTION METHOD AND DEVICE FOR HYDRAULIC CONTROL TURNING SYSTEM OF GENERATOR ROTOR", filed on Apr. 26, 2018 which claims the benefit of priority to Chinese patent application No. 201711459630.5 titled "Self-inspection method and device for hydraulic control turning system of generator rotor", filed with the Chinese State Intellectual Property Office on Dec. 28, 2017, the entire disclosures of which are incorporated herein by reference.

FIELD

The present disclosure relates to the technical field of wind turbines, and particularly to a self-inspection method and device for a hydraulic control turning system of a generator rotor.

BACKGROUND

It is well known that a generator in a wind turbine needs to be equipped with a turning system to perform necessary turning operations in specific situations. For example, before the generator that has not been used for a long time is restarted, a bearing of the generator should be turned to facilitate the formation of the oil film; in the assembly process of the wind turbine, blades installations are matched; after the assembly is completed, a calibration turning operation is performed to determine whether there is such a situation that load brought by the generator (that is, the mechanical or transmission part) has increasing resistance and thus the generator is stuck, so that the starting load of the generator is not increased to damage the generator (that is, burned out). Obviously, the turning system with reliable operations is key an indicator of the generator.

Figure 3:
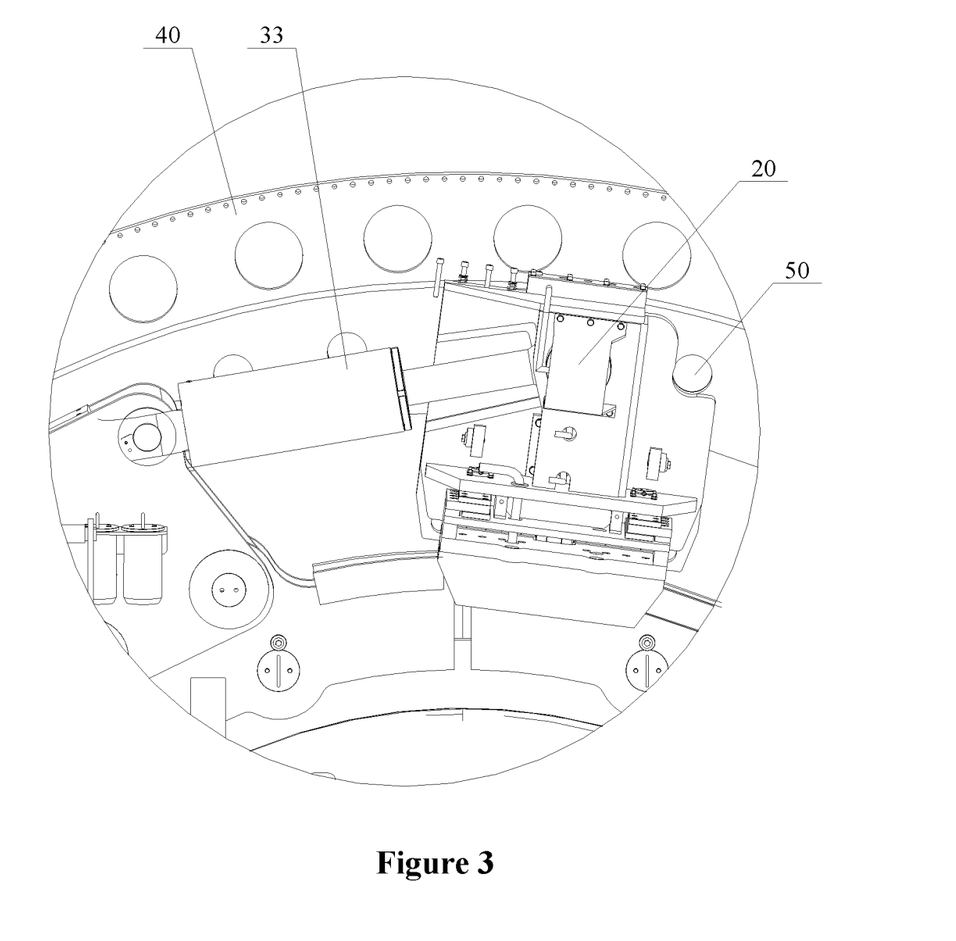
FIG. 3 is an enlarged schematic view of a portion A of FIG. 2.
Figure 4:
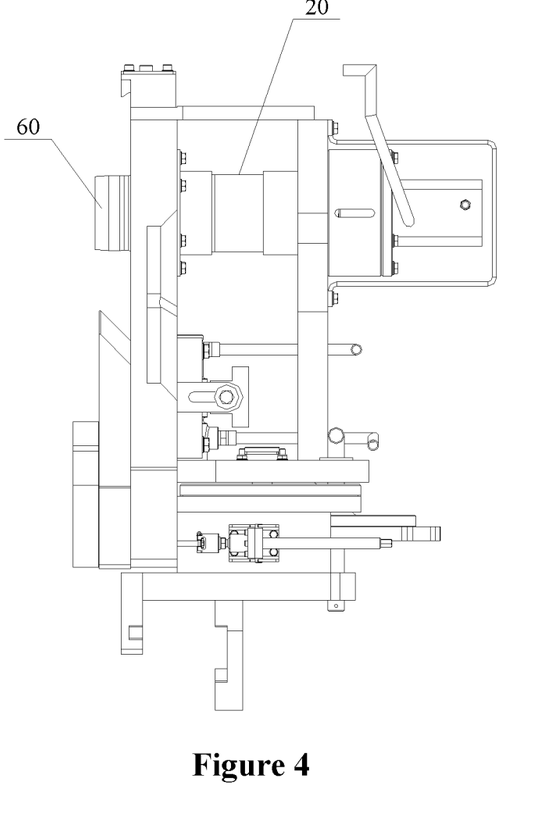
FIG. 4 is a side view of a driving unit of the hydraulic control turning system of a generator rotor.

Based on this, a hydraulic control turning system driven by hydraulic cylinders is proposed in the conventional art. The turning system is mounted on a nacelle base 10 and includes five driving units 20, referring to FIG. 1. The turning system uses five hydraulic cylinders 30 to provide a turning driving force. Specifically, the hydraulic cylinder 30, one end of which is fixed, can drive a displacement of the adapted driving unit 20; generator end cover holes 50 are uniformly distributed on a generator end cover 40 in a circumferential direction; after being moved to align with the target generator end cover hole 50, a turning pin 60 on each of the driving units 20 is inserted into the hole, as shown in FIGS. 2, 3 and 4. At this time, the extending or retracting of the hydraulic cylinders 30 can drive the generator end cover 40 to rotate and realize the turning operation. However, the conventional turning system does not have a self-inspection procedure, and thus it cannot inspect and verify whether there is a problem in the turning system before the turning operation, and whether the problem will affect the use.

In view of this, it is urgent to optimize the design of the conventional turning system to confirm whether the starting condition is satisfied before the turning system starts to work, thereby providing an effective guarantee for the good operation of the entire wind turbine generator.

SUMMARY

In order to solve the above technology problem, a self-inspection method and device for a hydraulic control turning system of a generator rotor is provided according to the present disclosure. The method and device can perform a self-inspection for the turning system before the working condition of the hydraulic control turning is enabled.

The self-inspection method for the hydraulic control turning system of the generator rotor according to the present disclosure includes the following steps:

establishing a length dimension relationship table among multiple hydraulic cylinders of the hydraulic control turning system;

selecting a reference hydraulic cylinder, and acquiring a reference length dimension when the reference hydraulic cylinder is located at a target working position, wherein the target working position is a position at which a turning pin corresponding to the reference hydraulic cylinder is inserted into an adapted hole; and performing a function inspection of a motion execution module in sequence by the multiple hydraulic cylinders, based on the reference length dimension and the length dimension relationship table: moving to a turning limit position, and inserting the turning pin into the adapted hole and pulling out the turning pin from the adapted hole to determine that the hydraulic control turning system has a first starting condition.

A self-inspection device for a hydraulic control turning system of a generator rotor according to the present disclosure includes:

a first inspection unit, configured to acquire a reference length dimension when the reference hydraulic cylinder is located at a target working position;

a storage unit, configured to store a length dimension relationship table among multiple hydraulic cylinders of the hydraulic control turning system; and a control unit, configured to control the multiple hydraulic cylinders to perform a function inspection of a motion execution module in sequence, based on the reference length dimension and the length dimension relationship table: configured to move to a turning limit position, and insert the turning pin into the adapted hole and pull out the turning pin from the adapted hole.

For the hydraulic control turning system, the above self-inspection technical solutions are proposed in a different way in the present disclosure. Compared with the conventional art, the present disclosure has the following beneficial effects.

First, when a turning operation is required to be performed, in the solutions, a reference hydraulic cylinder is selected before the system starts working, and a reference length dimension is used as a reference point when the reference hydraulic cylinder is located at a target working position, which is equivalent to a coordinate origin of the self-inspection procedure; based on the inherent length dimensions relationships among multiple hydraulic cylinders and the reference length dimension of the reference hydraulic cylinder, the multiple hydraulic cylinders are controlled to move to turning limit positions in sequence and insert the turning pin into the adapted hole and pull out the turning pin from the adapted hole to determine that the turning system satisfies a first starting condition, that is, to complete a function inspection of a motion execution module. Such setting can effectively guarantee the safety and reliability of the operation of the hydraulic control turning system, so that the operation efficiency of the entire generator is greatly improved base on the complete evasion of the adverse factors affecting the turning operation.

Secondly, in the preferred embodiment of the present disclosure, limit position inspections can be performed respectively for the multiple hydraulic cylinders to verify that each of the multiple hydraulic cylinders can move to its own limit position and to confirm that each of the multiple hydraulic cylinders itself has a good starting basis. Further, after the limit position inspection satisfies the second starting condition, the function inspection of the motion execution module is performed to maximally ensure the reliability of the turning operation.

Furthermore, in the present disclosure, a hydraulic cylinder having the smallest angle with respect to a horizontal plane is preferably selected to serve as the reference hydraulic cylinder, which has almost no load in a free state or the load in a free state is the smallest. Taking this hydraulic cylinder as a control reference can obtain the best accuracy.

Figure 7:
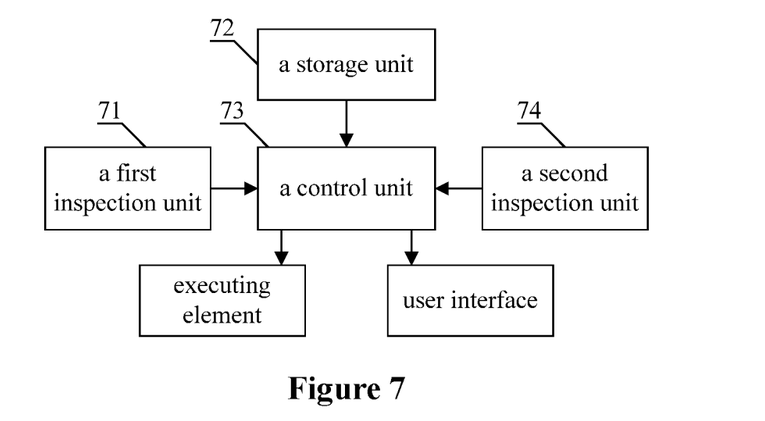
FIG. 7 is a unit block diagram of a self-inspection device for a hydraulic control turning system of a generator rotor according to an embodiment of the present disclosure.

Reference numerals in FIGS. 1 to 4:
10 nacelle base, 20 driving unit, 30 hydraulic cylinder, 40 generator end cover, 50 generator end cover hole, 60 turning pin; 31 first hydraulic cylinder, 32 second hydraulic cylinder, 33 third hydraulic cylinder, 34 fourth hydraulic cylinder, 35 fifth hydraulic cylinder;

Reference numerals in FIG. 7:
71 first inspection unit, 72 storage unit, 73 control unit, 74 second inspection unit

DETAILED DESCRIPTION

In order to make those skilled in the art better understand the technical solutions of the present disclosure, the present disclosure will be further described in detail below in conjunction with the drawings and specific embodiments.

Figure 1:
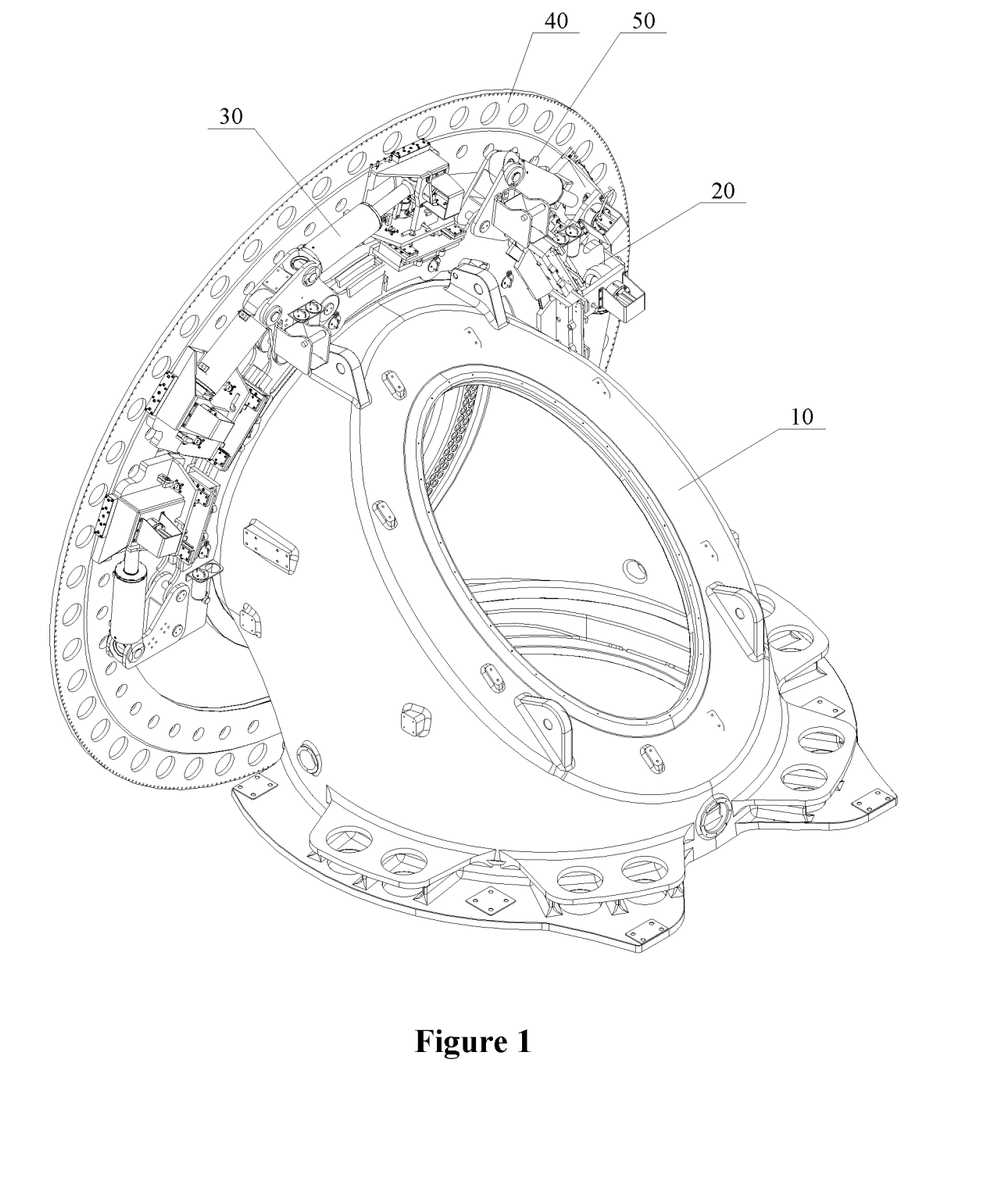
FIG. 1 is an axonometric schematic view of a hydraulic control turning system of a generator rotor.
Figure 2:
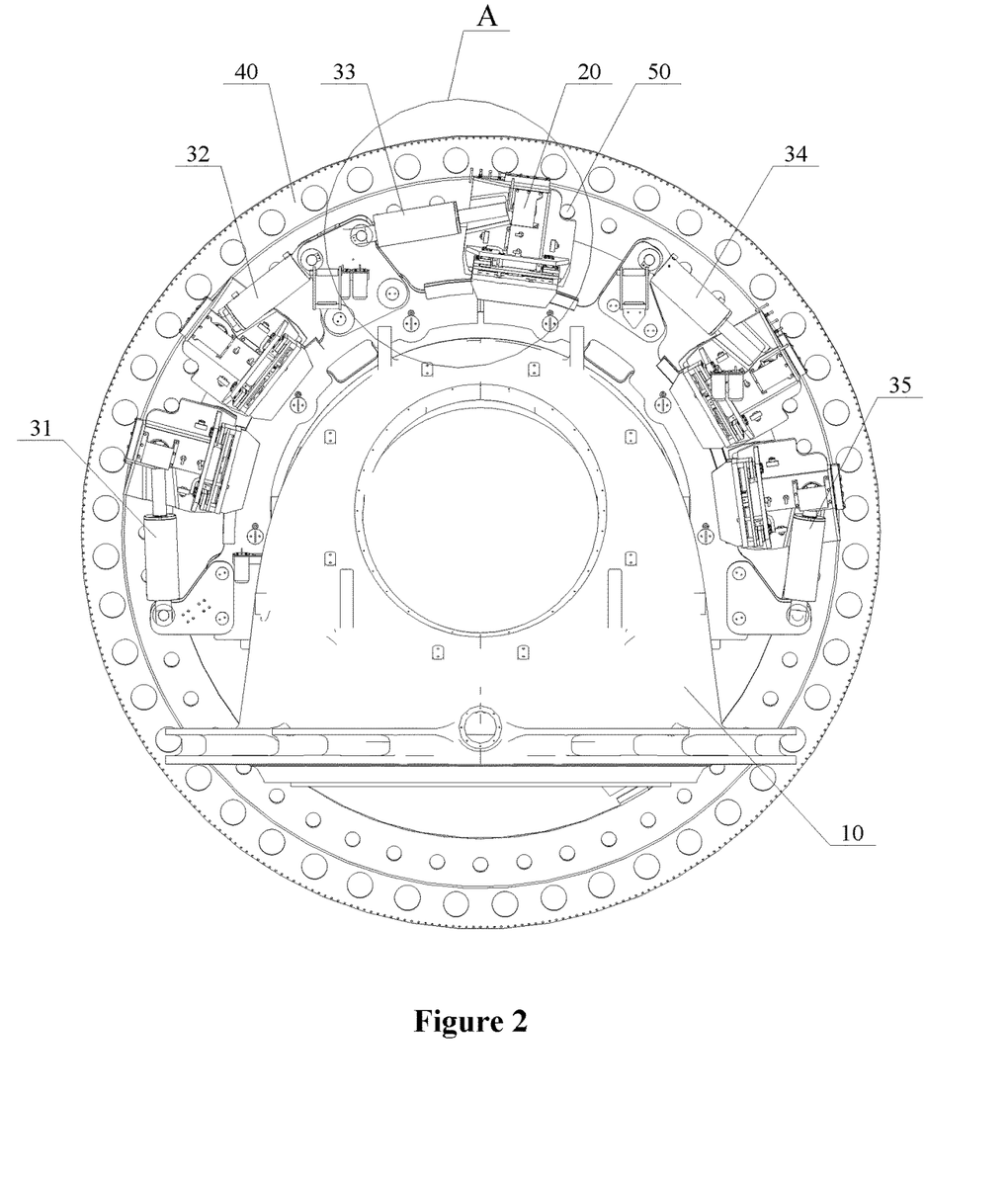
FIG. 2 is a front view of the turning system of FIG. 1.

Without loss of generality, a hydraulic control turning system shown in FIGS. 1 and 2 is used as a description main body in the present embodiment. The system employs five groups of driving units, and is supplemented by five adapted hydraulic cylinders to provide driving force. As shown in the drawings, the assembly directions of a first hydraulic cylinder 31, a third hydraulic cylinder 33, and a fourth hydraulic cylinder 34 are consistent, the assembly directions of a second hydraulic cylinder 32 and a fifth hydraulic cylinder 35 are consistent; and relative to the rotation direction of the turning system, each of the hydraulic cylinders is a pushing cylinder or a pulling cylinder, respectively. Specifically:

a. in a case that the generator rotates clockwise, the first hydraulic cylinder 31, the third hydraulic cylinder 33 and the fourth hydraulic cylinder 34 are a group of the pushing cylinders, and the second hydraulic cylinder 32 and the fifth hydraulic cylinder 35 are a group of pulling cylinders;

b. in a case that the generator rotates counterclockwise, the first hydraulic cylinder 31, the third hydraulic cylinder 33, and the fourth hydraulic cylinder 34 are a group of pulling cylinders, and the second hydraulic cylinder 32 and the fifth hydraulic cylinder 35 are a group of the pushing cylinders.

Explanation of Terms motion limit of a hydraulic cylinder: referring to a length limit that the hydraulic cylinder itself can be extended and retracted, that is, a longest elongated length and a shortest shortened length; a shortest limit position is a position where the hydraulic cylinder is at the shortest shortened length, and a longest limit position is a position where the hydraulic cylinder is at the longest elongated length, for a hydraulic cylinder with a stroke of 0 to 400 mm, the shortest limit position means that the hydraulic cylinder can be shortened to 0 mm in the shortest, and the longest limit position means that the hydraulic cylinder can be elongated to 400 mm in the longest. That is, the shortest shortened length of the hydraulic cylinder is 0 mm, and the longest elongated length is 400 mm;

motion limit of a hydraulic cylinder turning operation: referring to a length limit that the hydraulic cylinder can be elongated and shortened in the control procedure of the turning system, such as 10 to 390 mm, a shortest limit turning position means that the minimum length of the shortened hydraulic cylinder is 10 mm under the operation of the turning system. That is, a minimum that the hydraulic cylinder can be shortened to is 10 mm under the operation of the turning system. A longest limit turning position means that the hydraulic cylinder can be elongated to 390 mm under the operation of the turning system;

Centering: center lines of a pin and a hole are coincided.

Figure 5:
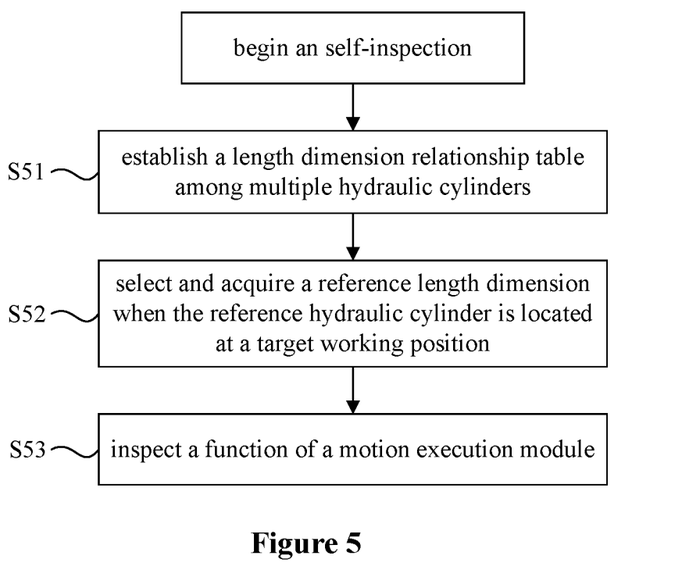
FIG. 5 is a flow chart of a self-inspection method for a hydraulic control turning system of a generator rotor according to a first embodiment.

Referring to FIG. 5, FIG. 5 is a flow chart of a self-inspection method, which is used for self-inspection before a hydraulic control turning system of a generator rotor is started according to an embodiment of the present disclosure.

As shown in FIG. 5, the self-inspection method for the hydraulic control turning system of the generator rotor includes the following steps S51-S53.

S51, a length dimension relationship table among multiple hydraulic cylinders is established.

The dimension relationship among the multiple hydraulic cylinders of the hydraulic control turning system is inherent. On the basis of each hydraulic cylinder used in the hydraulic control turning system, length dimension relationships, that is, difference relationships can all be theoretically determined; and the length dimension relationship table can respectively establish a dimension relationship with other hydraulic cylinders base on a reference hydraulic cylinder, or respectively establish a dimension relationship among the multiple hydraulic cylinders.

S52, a reference length dimension is selected and acquired when the reference hydraulic cylinder is located at a target working position.

The reference hydraulic cylinder can select the third hydraulic cylinder 33 that substantially tends to be horizontal. In a free state, the third hydraulic cylinder has almost no load. In comparison, the other hydraulic cylinders have own weight load of the driving unit, and taking the third hydraulic cylinder 33 as a control reference can obtain the best accuracy. In fact, there are different overall design requirements on the postures and angles of the hydraulic cylinders in different systems. The reference hydraulic cylinder is preferably a hydraulic cylinder having a smallest angle with respect to a horizontal plane among the multiple hydraulic cylinders, that is, it meets the requirement of avoiding the influence of self-weight load.

Preferably, acquiring the reference length dimension when the reference hydraulic cylinder is located at the target working position is a manual control mode. In the manual control mode, the control system causes the third hydraulic cylinder elongated, and by visual inspection or a sensor, the control system causes a turning pin centered with a hole on the generator end cover and the turning pin inserted into the generator end cover hole.

It should be noted that the "target working position" described herein is where the turning pin corresponding to the reference hydraulic cylinder is inserted into the adapted hole, that is, the turning pin is centered with the generator end cover hole, and the turning pin can be inserted into the generator end cover hole.

S53, a function of a motion execution module is inspected.

Based on the reference length dimension and the length dimension relationship table, five hydraulic cylinders perform the function inspection of the motion execution module in sequence: moving to a turning limit position, and inserting the turning pin into the adapted hole and pulling out the turning pin from the adapted hole to determine that the turning system meets a first starting condition, that is, inspecting the motion limit of the hydraulic cylinder turning operation and inspecting whether the matching interface between the motion module and the generator meets the operation conditions of the turning operation.

In the function inspection of the motion execution module, the motion can include clockwise moving to the turning limit position and/or counterclockwise moving to the turning limit position.

For the counterclockwise motion inspection, detail of the action order of the five hydraulic cylinders is as follows in sequence:

first, the function inspection of the motion execution module of the fifth hydraulic cylinder 35 includes:
  a) the fifth hydraulic cylinder 35 is moved to the longest turning limit position;
  b) the turning pin is centered with the generator end cover hole and inserted into the hole;
  c) the turning pin is pulled out from the hole of the end cover;

second, the function inspection of the motion execution module of the fourth hydraulic cylinder 34 includes:
  a) the fourth hydraulic cylinder 34 is moved to the shortest turning limit position;
  b) the turning pin is centered with the generator end cover hole and inserted into the hole;
  c) the turning pin is pulled out from the hole of the end cover;

third, the function inspection of the motion execution module of the third hydraulic cylinder 33 includes:
  a) the third hydraulic cylinder 33 is moved to the shortest turning limit position;
  b) the turning pin is centered with the generator end cover hole and inserted into the hole;
  c) the turning pin is pulled out from the hole of the end cover;

fourth, the function inspection of the motion execution module of the second hydraulic cylinder 32 includes:
  a) the second hydraulic cylinder 32 is moved to the longest turning limit position;
  b) the turning pin is centered with the generator end cover hole and inserted into the hole;
  c) the turning pin is pulled out from the hole of the end cover;

fifth, the function inspection of the motion execution module of the first hydraulic cylinder 31 includes:
  a) the first hydraulic cylinder 31 is moved to the shortest turning limit position;
  b) the turning pin is centered with the generator end cover hole and inserted into the hole;
  c) the turning pin is pulled out from the hole of the end cover.

For the clockwise motion inspection, details of the action order of the five hydraulic cylinders are as follows in sequence:

first, the function inspection of the motion execution module of the first hydraulic cylinder 31 includes:
  a) the first hydraulic cylinder 31 is moved to the longest turning limit position;
  b) the turning pin is centered with the generator end cover hole and inserted into the hole;
  c) the turning pin is pulled out from the hole of the end cover;

second, the function inspection of the motion execution module of the second hydraulic cylinder 32 includes:
  a) the second hydraulic cylinder 32 is moved to the shortest turning limit position;
  b) the turning pin is centered with the generator end cover hole and inserted into the hole;
  c) the turning pin is pulled out from the hole of the end cover;

third, the function inspection of the motion execution module of the third hydraulic cylinder 33 includes:
  a) the third hydraulic cylinder 33 is moved to the longest turning limit position;
  b) the turning pin is centered with the generator end cover hole and inserted into the hole;
  c) the turning pin is pulled out from the hole of the end cover;

fourth, the function inspection of the motion execution module of the fourth hydraulic cylinder 34 includes:
  a) the fourth hydraulic cylinder 34 is moved to the longest turning limit position;
  b) the turning pin is centered with the generator end cover hole and inserted into the hole;
  c) the turning pin is pulled out from the hole of the end cover;

fifth, the function inspection of the motion execution module of the fifth hydraulic cylinder 35 includes:
  a) the fifth hydraulic cylinder 35 is moved to the shortest turning limit position;
  b) the turning pin is centered with the generator end cover hole and inserted into the hole;
  c) the turning pin is pulled out from the hole of the end cover.

Here, inspecting the motion limit of the hydraulic cylinder turning operation and inspecting whether the matching interface between the motion module and the generator meets the operation conditions of the turning operation can be made by manually observing the corresponding matching components, or can be automatically determined and confirmed by acquiring an insert signal and a pull out signal of the turning pin, and feeding back the signals to the operator through the user interaction interface, or synchronously saving the signals to the system management database.

Figure 6:
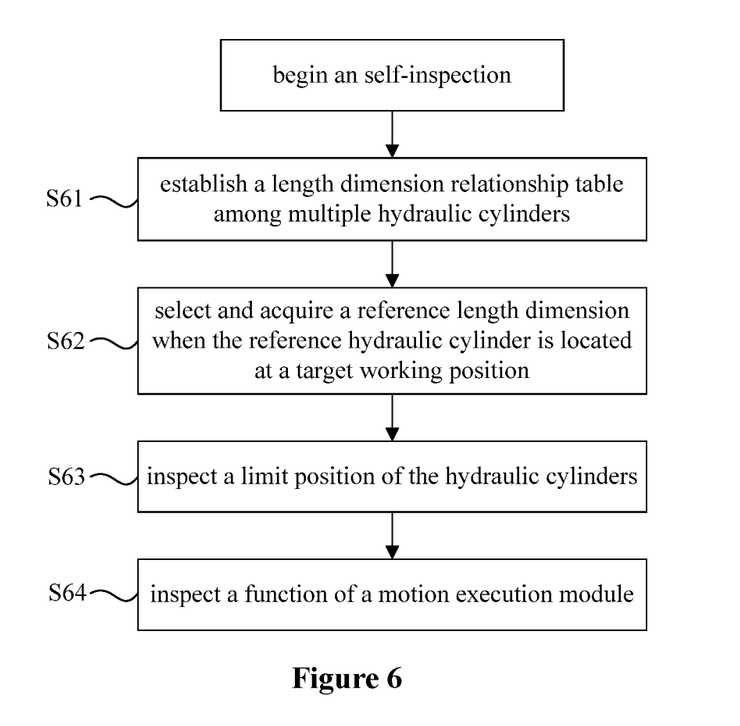
FIG. 6 is a flow chart of a self-inspection method for a hydraulic control turning system of a generator rotor according to a second embodiment.

Referring to FIG. 6, FIG. 6 is a flow chart of a self-inspection method according to a second embodiment of the present disclosure. As shown in FIG. 6, the self-inspection method for the hydraulic control turning system of the generator rotor includes the following steps S61-S64.

S61, a length dimension relationship table among multiple hydraulic cylinders is established.

The dimension relationship among the multiple hydraulic cylinders of the hydraulic control turning system is inherent. On the basis of each hydraulic cylinder used in the hydraulic control turning system, length dimension relationships, that is, difference relationships can all be theoretically determined; and the length dimension relationship table can respectively establish a dimension relationship with other hydraulic cylinders base on a reference hydraulic cylinder, or respectively establish a dimension relationship among the multiple hydraulic cylinders.

S62, a reference length dimension is selected and acquired when the reference hydraulic cylinder is located at a target working position.

The reference hydraulic cylinder can select the third hydraulic cylinder 33 that substantially tends to be horizontal. In a free state, the third hydraulic cylinder has almost no load. Similarly, the "target working position" herein is where the turning pin corresponding to the reference hydraulic cylinder is inserted into the adapted hole.

S63, a limit position of the hydraulic cylinders is inspected.

The multiple hydraulic cylinders are respectively subjected to the limit position inspection to verify that each of the hydraulic cylinders can move to its own limit position. Here, the limit position inspection can acquire length dimensions of the hydraulic cylinders located at the limit position to determine that the turning system has a second starting condition, that is, to confirm that the function of the hydraulic cylinder itself has a good starting basis.

S64, a function of a motion execution module is inspected, which is specifically the same as the first embodiment.

It should be appreciated that the execution order of the function inspection of the motion execution module and limit position inspection of the hydraulic cylinders is not specifically limited herein. After the limit position inspection satisfies the second starting condition, the function inspection of the motion execution module is performed. Obviously, this can maximally ensure the reliability of the turning operation.

Specifically, in the limit position inspection, the motion can also include clockwise moving to the limit position and/or counterclockwise moving to the limit position. The motion directions of the limit position inspection and the function inspection of the motion execution module should be consistent.

For the limit position inspection and the function inspection of the motion execution module, an operation order that they respectively follows is moving counterclockwise and then moving clockwise. Details thereof are as follows:

first, five driving hydraulic cylinders being moved one by one in the counterclockwise direction to the limit position of the hydraulic cylinders includes:
  a) the first hydraulic cylinder 31 is moved in the counterclockwise direction to the shortest limit position;
  b) the second hydraulic cylinder 32 is moved in the counterclockwise direction to the longest limit position;
  c) the third hydraulic cylinder 33 is moved in the counterclockwise direction to the shortest limit position;
  d) the fourth hydraulic cylinder 34 is moved in the counterclockwise direction to the shortest limit position;
  e) The fifth hydraulic cylinder 35 is moved in the counterclockwise direction to the longest limit position;

second, the function inspection of the motion execution module of the fifth hydraulic cylinder 35 includes:
  a) the fifth hydraulic cylinder 35 is moved to the longest turning limit position;
  b) the turning pin is centered with the generator end cover hole and inserted into the hole;
  c) the turning pin is pulled out from the hole of the end cover;

third, the function inspection of the motion execution module of the fourth hydraulic cylinder 34 includes:
  a) the fourth hydraulic cylinder 34 is moved to the shortest turning limit position;
  b) the turning pin is centered with the generator end cover hole and inserted into the hole;
  c) the turning pin is pulled out from the hole of the end cover;

fourth, the function inspection of the motion execution module of the third hydraulic cylinder 33 includes:
  a) the third hydraulic cylinder 33 is moved to the shortest turning limit position;
  b) the turning pin is centered with the generator end cover hole and inserted into the hole;
  c) the turning pin is pulled out from the hole of the end cover;

fifth, the function inspection of the motion execution module of the second hydraulic cylinder 32 includes:
  a) the second hydraulic cylinder 32 is moved to the longest turning limit position;
  b) the turning pin is centered with the generator end cover hole and inserted into the hole;
  c) the turning pin is pulled out from the hole of the end cover;

sixth, the function inspection of the motion execution module of the first hydraulic cylinder 31 includes:
  a) the first hydraulic cylinder 31 is moved to the shortest turning limit position;
  b) the turning pin is centered with the generator end cover hole and inserted into the hole;
  c) the turning pin is pulled out from the hole of the end cover.

seventh, five driving hydraulic cylinders are moved one by one in the clockwise direction to the limit position of the hydraulic cylinders includes:
  a) the fifth hydraulic cylinder 35 is moved in the clockwise direction to the shortest limit position;
  b) the fourth hydraulic cylinder 34 is moved in the clockwise direction to the longest limit position;
  c) the third hydraulic cylinder 33 is moved in the clockwise direction to the longest limit position;
  d) the second hydraulic cylinder 32 is moved in the clockwise direction to the shortest limit position;
  e) The first hydraulic cylinder 31 is moved in the clockwise direction to the longest limit position;

eighth, the function inspection of the motion execution module of the first hydraulic cylinder 31 includes:
  a) the first hydraulic cylinder 31 is moved to the longest turning limit position;
  b) the turning pin is centered with the generator end cover hole and inserted into the hole;
  c) the turning pin is pulled out from the hole of the end cover;

ninth, the function inspection of the motion execution module of the second hydraulic cylinder 32 includes:
   a) the second hydraulic cylinder 32 is moved to the shortest turning limit position;
   b) the turning pin is centered with the generator end cover hole and inserted into the hole;
   c) the turning pin is pulled out from the hole of the end cover;

tenth, the function inspection of the motion execution module of the third hydraulic cylinder 33 includes:
   a) the third hydraulic cylinder 33 is moved to the longest turning limit position;
   b) the turning pin is centered with the generator end cover hole and inserted into the hole;
   c) the turning pin is pulled out from the hole of the end cover;

eleventh, the function inspection of the motion execution module of the fourth hydraulic cylinder 34 includes:
   a) the fourth hydraulic cylinder 34 is moved to the longest turning limit position;
   b) the turning pin is centered with the generator end cover hole and inserted into the hole;
   c) the turning pin is pulled out from the hole of the end cover;

twelfth, the function inspection of the motion execution module of the fifth hydraulic cylinder 35 includes:
   a) the fifth hydraulic cylinder 35 is moved to the shortest turning limit position;
   b) the turning pin is centered with the generator end cover hole and inserted into the hole;
   c) the turning pin is pulled out from the hole of the end cover.

Of course, the limit position inspection and the function inspection of the motion execution module may also be such a design, that is, they respectively move counterclockwise after moving clockwise, which can also complete the above self-inspection operation.

Referring to FIG. 7, FIG. 7 is a unit block diagram of a self-inspection device for a hydraulic control turning system of a generator rotor according to an embodiment of the present disclosure.

As shown in FIG. 7, the self-inspection device of the hydraulic control turning system of the generator rotor includes a first inspection unit 71, a storage unit 72 and a control unit 73.

The first inspection unit 71 acquires the reference length dimension when the reference hydraulic cylinder is located at the target working position; here, the first inspection unit 71 can realize a signal collection and acquisition by using a sensor. The specific structural principle of the sensor is not the point of the present disclosure, those skilled in the art can select the sensor based on the concept of the present disclosure, and details are not described herein again. Of course, the first inspection unit 71 configured for acquiring the length of the hydraulic cylinders can also acquire the limit positions of the multiple hydraulic cylinders and the limit positions of the turning operation, and output the above information to the control unit to determine that the turning system meets a second starting condition.

The storage unit 72 stores a length dimension relationship table among the multiple hydraulic cylinders of the hydraulic control turning system. The relationship table can be preset based on the hydraulic cylinder parameters of the specific turning system.

The control unit 73, based on the reference length dimension and the length dimension relationship table, can send specific instructions to control the multiple hydraulic cylinders to perform the function inspection of the motion execution module in sequence: moving to a turning limit position, and inserting the turning pin into the adapted hole and pulling out the turning pin from the adapted hole. Further, the control unit 73 can also send specific instructions to control the multiple hydraulic cylinders to respectively perform a limit position inspection: moving to a limit position of the hydraulic cylinder. The control unit 73 can be set independently or can utilize the control unit of the entire device control system.

In addition, in order to achieve a better user experience, the self-inspection device may further include a second inspection unit 74. The second inspection unit 74 acquires an insert signal and a pull out signal of the turning pin and outputs the signals to the control unit 73, so as to determine that the turning system meets a first starting condition. Similarly, the second inspection unit 74 can also implement the signal acquisition by using a sensor.

It should be noted that the above embodiments according to the present embodiment are not limited to that the five hydraulic cylinders, the assembly direction of which is shown in FIGS. 1 and 2, are used as the control basis. It should be appreciated that as long as the core concept is consistent with the present solutions, it is within the protection scope of the present disclosure.

The description above is only a preferred embodiment of the present disclosure. It should be noted that, for the person skilled in the art, a few of modifications and improvements may be made to the present disclosure without departing from the principle of the present disclosure, and these modifications and improvements are also deemed to fall into the scope of the present disclosure defined by the claims.

The invention claimed is:

1. A self-inspection method for a hydraulic control turning system of a generator rotor, comprising:
   establishing a length dimension relationship table among a plurality of hydraulic cylinders of the hydraulic control turning system, wherein the length dimension relationship table comprises information relating to a relationship between a length of each of the plurality of hydraulic cylinders and the length of the other of the plurality of hydraulic cylinders, the length of each of the plurality of hydraulic cylinders being a measure of how much the hydraulic cylinder is extended or retracted;
   selecting a reference hydraulic cylinder and acquiring a reference length dimension when the reference hydraulic cylinder is located at a target working position, wherein the target working position is a position at which a turning pin corresponding to the reference hydraulic cylinder is inserted into an adapted hole; and
   performing, by the plurality of the hydraulic cylinders, a function inspection of a motion execution module in sequence based on the reference length dimension and the length dimension relationship table: moving to a turning limit position, and inserting the turning pin into the adapted hole and pulling out the turning pin from the adapted hole to determine that the hydraulic control turning system meets a first starting condition.

2. The self-inspection method for the hydraulic control turning system of the generator rotor according to claim 1, wherein, in the function inspection of the motion execution module, the motion comprises clockwise moving to the turning limit position and/or counterclockwise moving to the turning limit position.

3. The self-inspection method for the hydraulic control turning system of the generator rotor according to claim 1, wherein the function inspection of the motion execution module comprises acquiring an insert signal and a pull out signal of the turning pin to determine that the hydraulic control turning system meets the first starting condition.

4. The self-inspection method for the hydraulic control turning system of the generator rotor according to claim 1, further comprising:
performing a limit position inspection by the plurality of the hydraulic cylinders respectively: moving to limit positions of the plurality of hydraulic cylinders.

5. The self-inspection method for the hydraulic control turning system of the generator rotor according to claim 4, wherein, in the limit position inspection, the motion comprises clockwise moving to the limit positions and/or counterclockwise moving to the limit positions.

6. The self-inspection method for the hydraulic control turning system of the generator rotor according to claim 4 or claim 5, wherein the limit position inspection also comprises acquiring length dimensions of the plurality of hydraulic cylinders located at the limit positions to determine that the turning system meets a second starting condition.

7. The self-inspection method for the hydraulic control turning system of the generator rotor according to claim 6, comprising: after the limit position inspection satisfies the second starting condition, performing the function inspection of the motion execution module:
the limit position inspection and the function inspection of the motion execution module being respectively counterclockwise performed after being clockwise performed;
or, the limit position inspection and the function inspection of the motion execution module being respectively clockwise performed after being counterclockwise performed.

8. The self-inspection method for the hydraulic control turning system of the generator rotor according to claim 4, wherein moving directions of the limit position inspection and the function inspection of the motion execution module are consistent.

9. The self-inspection method for the hydraulic control turning system of the generator rotor according to claim 1, wherein the acquiring the reference length dimension when the reference hydraulic cylinder is located at the target working position is a manual control mode.

10. The self-inspection method for the hydraulic control turning system of the generator rotor according to claim 1, the reference hydraulic cylinder is a hydraulic cylinder having a smallest angle with respect to a horizontal plane among the plurality of hydraulic cylinders.

* * * * *